United States Patent Office 3,090,952
Patented May 21, 1963

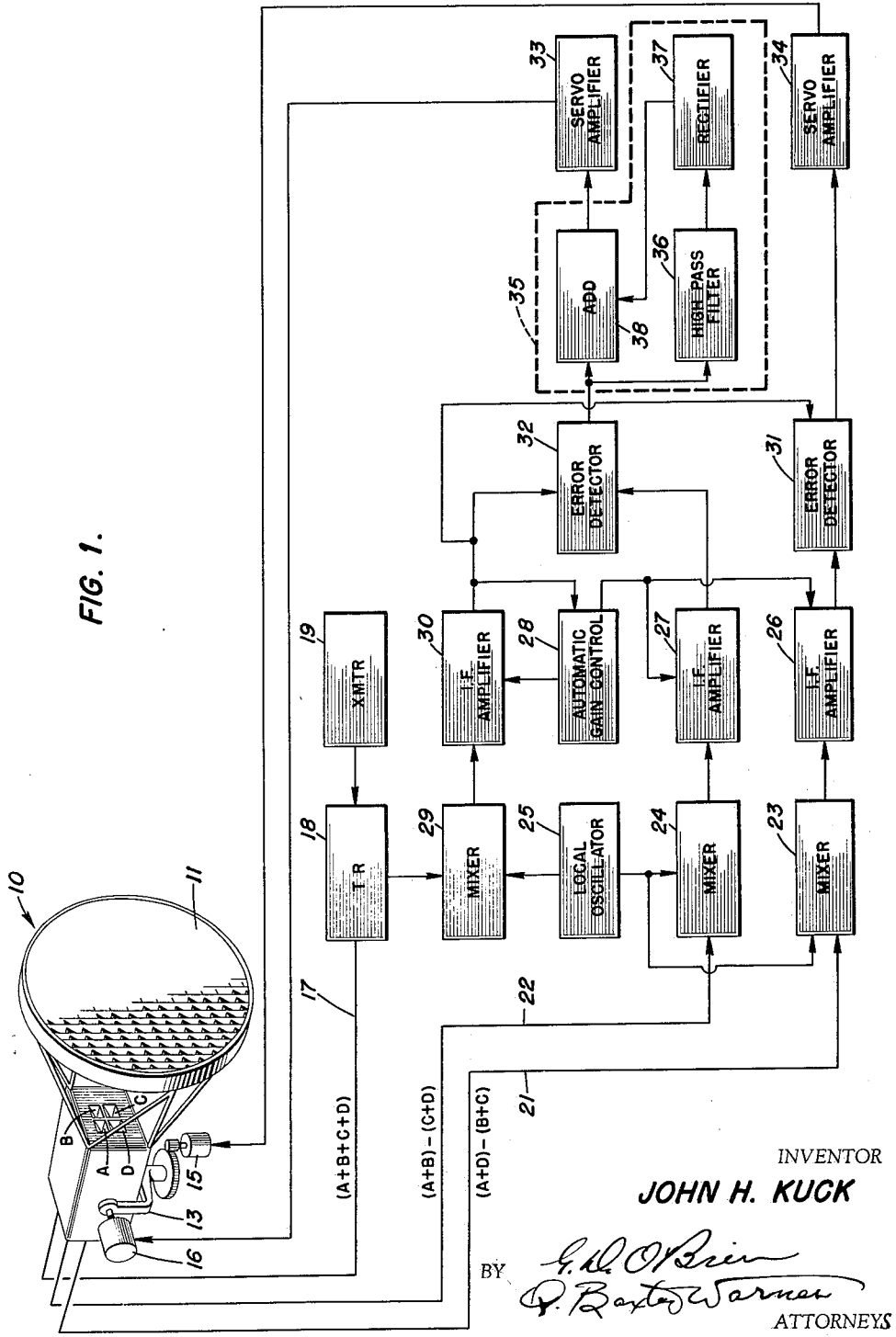

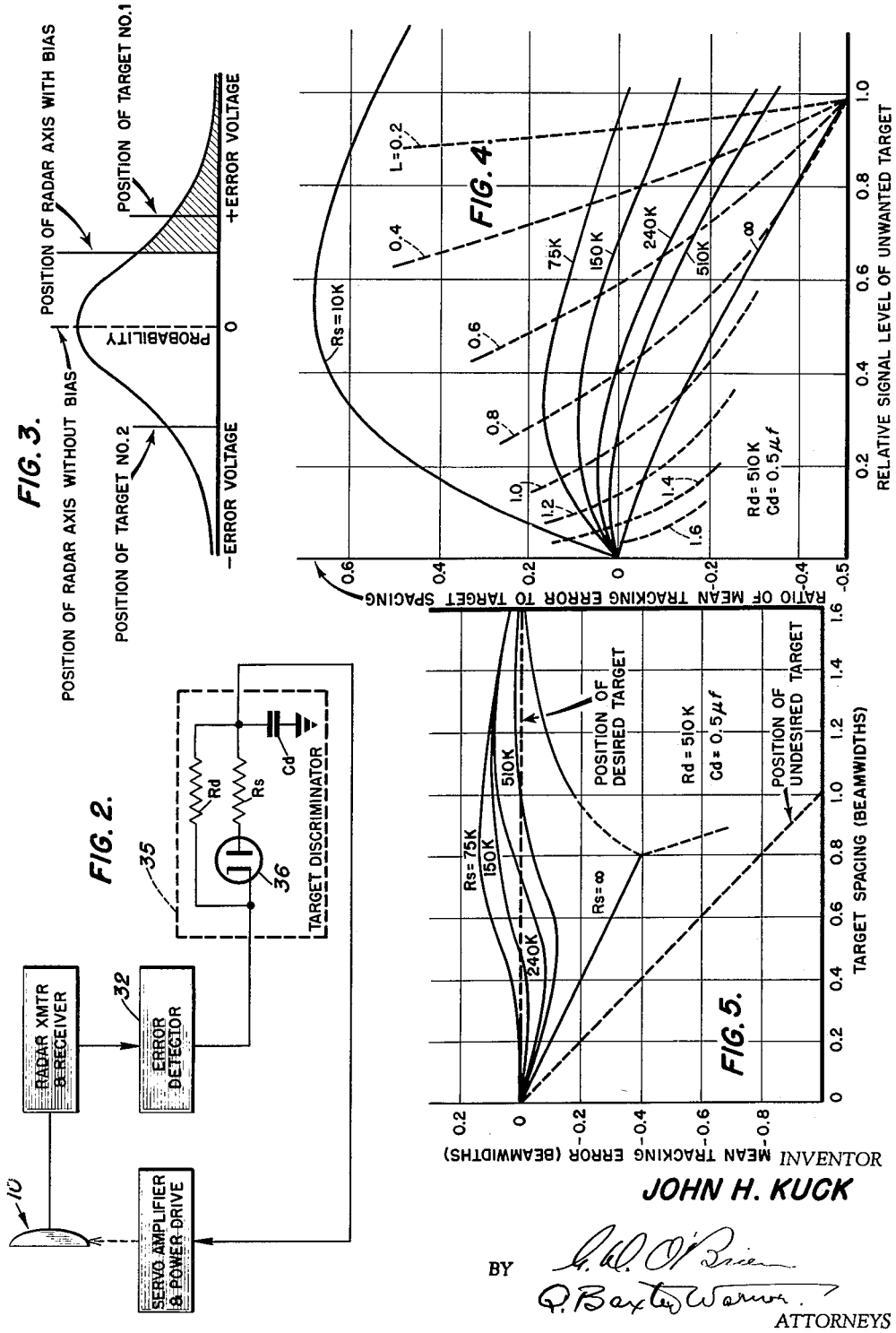

3,090,952
TARGET DISCRIMINATOR
John H. Kuck, Silver Spring, Md., assignor to the United States of America as represented by the Secretary of the Navy
Filed Nov. 14, 1955, Ser. No. 546,835
6 Claims. (Cl. 343—16)

The present invention relates to detectors for radar receivers. More specifically, it relates to a target discriminator useful in assisting an automatic tracking radar to discriminate between several targets in formation rather than to fall into a confused wandering between the available targets.

Conical scanning radars represent the most common means by which automatic target tracking is accomplished. In radars of this type, as the main antenna lobe nutates about the tracking axis, a target displaced from the tracking axis will receive a greater amount of energy at one instant than during the balance of the scan cycle. Ideally, therefore, the received signal varies in amplitude according to the target's distance from the tracking axis, and that variation comprises the error signal for correcting the pointing of the radar.

Conical scan radars are unable to distinguish between amplitude variations due to target noise and amplitude variations due to scanning. At extended range, conical scan radars will be somewhat in error in their pointing merely as a result of noise.

One method of increasing radar tracking accuracy involves the use of simultaneous lobe comparison. In the simultaneous lobe comparison or "mono-pulse" radar, tracking information is obtained from a single pulse rather than by comparison of the amplitudes of several pulses, as in the conical scan radar. Therefore, the pointing error of the monopulse radar is little influenced by amplitude noise.

Both the monopulse and conical radars suffer a serious shortcoming in that they are unable to distinguish between multiple targets in a horizontal or vertical formation. Tandem target formations present no particular difficulties, since the targets are then distinguishable by means of a conventional range gate. However, depending upon the response of the radar servo, troublesome formations of targets cause the radar either to point fixedly at the center of the target formation, or to wander haphazardly from one target to another.

Accordingly it is an object of the present invention to provide a means for enabling a monopulse radar to discriminate between confusing multiple targets.

Another object of the present invention is to provide a means for distinguishing signal fluctuations due to multiple target noise from those due to target maneuvers.

A further object of the present invention is to provide a biasing means for directing the radar towards a single target of a plurality of available targets.

Other objects and many of the attendant advantages of this invention will be readily appreciated as the same becomes better understood when considered in connection with the accompanying drawings.

Briefly, the present invention comprises the combination with a simultaneous lobe comparison radar of a frequency selective rectifier which is adapted to provide a bias voltage proportional to target noise. The circuit includes a diode combined with a resistor-capacitor filter, the time constant of which is adjusted so that the filter will pass low frequency maneuver and error signals without developing a bias.

In the drawings:

FIG. 1 is a functional block diagram of the combination of the present invention;

FIG. 2 is a schematic diagram of the present invention;

FIG. 3 is a chart indicating the probability density function of the amplitude of an error signal produced by multiple targets in a monopulse radar;

FIG. 4 is a chart of the mean error in tracking one of a pair of targets for a simulated radar having a linear antenna pattern and with various circuit constants in the target discriminator of the present invention; and FIG. 5 is a chart showing the transformation of the data of FIG. 4 to predict the performance of a radar having a Gaussian type of non-linear antenna pattern.

In FIG. 1 of the drawings, the invention is shown in general form. The monopulse radar antenna, shown generally at 10, comprises a cluster of four receiving horns, A, B, C, and D, the projection of the center of the cluster being the tracking axis of the antenna. A lens 11 focuses the radiated energy into a beam. The horns A, B, C, and D are supported by a suitable mount 13 which is movable in azimuth and elevation by a train servomotor 15 and by an elevation servomotor 16. Suitable waveguide couplings provide a reference channel 17 in which the output of all four horns is added to provide a signal $(A+B+C+D)$. The reference channel 17 is employed for transmission and reception, and is therefore equipped with a conventional T—R box 18 and transmitter 19. There is also provided an azimuth error channel 21 in which the outputs of the horns are combined to provide an output $(A+D)-(B+C)$, and an elevation error channel 22 having an output $(A+B)-(C+D)$.

A target displaced from the axis of symmetry of the antenna produces an echo which varies in amplitude at each of the horns A, B, C, and D. The reference channel 17 is employed to provide a phase reference voltage with respect to which the phase of the error channel signals indicates the sense of the error; that is, whether the target is above or below, or left or right of the tracking axis. The R.F. signals in the azimuth and elevation error channels 21 and 22, after conversion to I.F. signals by mixers 23 and 24, which are supplied heterodyne signals by a common local oscillator 25, are applied to matched I.F. amplifiers 26 and 27. The R.F. signals in reference channel 17 are converted to I.F. signals by a mixer 29 and the local oscillator 25 and amplified in I.F. amplifier 30. The output of I.F. amplifier 30 provides the phase reference voltage for phase comparison with the output of the error channel I.F. amplifiers 26 and 27. The output of I.F. amplifier 30 also constitutes the input to an automatic gain control circuit 28 which, in the case of a single target, removes the false error effects of target amplitude noise by controlling the gain of I.F. amplifiers 26, 27, and 30. Phase sensitive error detectors 31 and 32 receive the output of the error channel I.F. amplifiers 26 and 27 and the phase reference voltage from the reference I.F. amplifier 30. The detector outputs possess amplitudes corresponding to the off-axis distance of the target and polarities corresponding to the off-axis direction of the target.

The detector outputs comprise low frequency error signals (less than 0.1 c.p.s.) which are employed as the inputs to the antenna positioning servo system. The elevation servo system includes a servo amplifier 33 which supplies power proportional to the elevation error signal to elevation servomotor 16. The azimuth servo system is similar to the elevation servo system and includes a servo-amplifier 34 and the azimuth servomotor 15.

In tracking a single target, the servomotors move the antenna mount in such a direction as to reduce the output of detectors 31 and 32 to zero. In FIG. 3, the effect of multiple targets upon the elevation or azimuth error signal is shown. The ordinates of FIG. 3 represent the probability of the occurrence of an error voltage corresponding to a particular target location. It will be seen that if the radar axis is midway between the two targets, as it will be in the absence of bias, the probability of occurrence of an error voltage corresponding to the actual target location is considerably less than the probability of zero error voltage. Zero error voltage, of course, indicates to the radar that it is tracking properly. The reason the radar occupies a position midway between the two targets depends in a large part upon the response of the servo. A finite probability exists that there will be an error voltage corresponding to an apparent target location far beyond the actual target position. Since the probability of such a signal is small, however, the signal would take the form of a sudden transient and therefore only highly responsive servos would ever follow a noise signal far beyond the actual target location. It is difficult to extend servo frequency response beyond a certain point because of motor and load inertia. Suitable designs are capable of following target maneuvers closely but yet fail to respond to rapidly varying signals. For the usual servo the radar will therefore occupy a position near the peak of the distribution curve and fluctuate rather restrictedly about that point.

If, however, a suitable amount of target noise is rectified, thereby producing a direct current signal, and the direct current signal is added to the normal error signal, it will be understood that the radar will be biased in the direction of one target. The tracking is thereby improved.

The apparatus for biasing the radar is shown generally at 35 in FIG. 1. The high frequency noise is separated from the detector output by a high pass filter 36 and is rectified by rectifier 37 to insure a single polarity of biasing and to provide a direct current component within the ability of the servo to respond. The bias voltage recovered from the noise is added in an adder 38 to the normal detector output and, according to the proportion of normal signal to noise bias signal, positions the radar axis at a point between a multiple target midpoint and one of the individual targets.

The target discriminator shown generally at 35 in FIG. 1 may, in practice, assume the form shown in FIG. 2. The discriminator comprises a resistor $Rd$ connected in series with the detector 32 and the servo amplifier 33. A capacitor $Cd$ shunts the servo amplifier input to ground. A diode rectifier 36 and series resistor $Rs$ form a parallel path with resistor $Rd$. The function of adder 38 is performed at the junction of resistor $Rs$ and $Rd$ and capacitor $Cd$. Resistor $Rd$ and capacitor $Cd$ form a low-pass filter, which reduces the high frequency input signals to servo amplifier 33 and thus prevents its being needlessly saturated. Resistor $Rd$ and capacitor $Cd$ provide, in effect, a high pass noise filter for the signal voltage applied to the diode. At low frequencies comparatively little voltage is developed across resistor $Rd$, hence the current through diode 36 and resistor $Rs$ is small. As the frequency is increased, the voltage drop across resistor $Rd$ increases, resulting in increased diode conduction.

The biasing circuit does not lend itself to mathematical treatment due to its non-linearity. However, if the high frequency components of the rectified noise signal are considered to be effectively filtered out by the capacitor $Cd$ and the servo, it can be said that the radar axis will be displaced towards one of the targets to the point where the moment of area of the shaded portion of FIG. 3 is to the moment about zero of the area of the entire curve as the resistance $Rs$ is to the resistance $Rd$. The shaded portion of FIG. 3 represents the region of diode conduction. Therefore, as the amount of rectified noise in proportion to the normal signal is increased by decreasing the ratio of $Rs$ to $Rd$, the radar axis moves toward the right. The optimum value of the ratio of $Rs$ to $Rd$ is the value required to move the radar axis into coincidence with the position of the right-hand target.

The distribution curve of FIG. 3 is representative of any spacing of targets within a linear antenna pattern. Therefore, the selection of an optimum value of the ratio of $Rs$ to $Rd$ for a specified target spacing would be suitable for any spacing within the linear region.

In FIG. 4, the effect of various values of the ratio of $Rs$ to $Rd$ is shown for variations in the relative signal level of two available targets. The curves of FIG. 4 illustrate cases, for example, where the targets are dissimilar in size or reflectively, but do not include the effects of non-linearities in the beam pattern.

Consider first the case of equal signals received from a pair of targets. With no bias applied by way of the rectified noise signal, a condition obtained by making the ratio of $Rs$ to $Rd$ infinite, the normalized tracking error is 0.5. That is, the radar position is midway between the targets. If it is desired to move the radar into coincidence with one of the targets, it appears that the best value of $Rs$ is 75,000 ohms, making the ratio of $Rs$ to $Rd$ equal to 0.15, as that curve lies quite near to the zero error line for equal signal levels.

The tracking error is plotted as a dimensionless quantity and is obtained by dividing the error expressed in units of distance by the target spacing expressed in similar units. The relative signal level is the voltage ratio of the signal of the unwanted target to the signal from the desired target and thus similarly dimensionless.

The curves of FIG. 4 are experimental results obtained by means of a simulator with $Rd$ equal to 510,000 ohms and $Cd$ equal to 0.5 $\mu f$. The curves are of particular interest since they may be utilized in constructing curves for the non-linear antenna patterns generally encountered in practice.

Target spacing is an important factor when the effects of antenna pattern non-linearity are considered. Obviously, widely spaced multiple targets present no difficulties as the radar can easily track a single target while the remaining target or targets are outside the beam. A more closely spaced target pair presents the situation of one of the targets lying closer to the beam center than the other and therefore the signals received from the pair will be unequal in amplitude.

The curves of FIG. 4 may be transformed to the case of a Gaussian type antenna pattern in the following manner. The multiplying factor for imparting non-linearity may be expressed as $$A = \epsilon^{-K\theta^2}$$

where K is a constant, and $\theta$ is the off-axis angle of the target. A first target located an angular distance M from the radar axis will produce a signal $A_1 = \epsilon^{-KM^2}$. A second target located an angular distance L from the first target will produce a signal $A_2 = \epsilon^{-K(L+M)^2}$. For convenience, L and M are expressed in beamwidths. The ratio $A_2/A_1$ is the signal strength of the unwanted target relative to the desired target and is therefore independent of any absolute units. M, the tracking error in beamwidths, is divided by L to enable the plotting of the tracking error as a dimensionless quantity in FIG. 4. The beamwidth is chosen in accordance with established convention as being the angle between the half-power points of the beam. Thus there is superimposed upon FIG. 4 a family of curves in which dimensionless M is plotted against $A_2/A_1$ for various values of L in beamwidths. These curves are shown as dotted lines. The intersections of the dotted line antenna pattern curves with the solid line curves of FIG. 4 provides a series of points which, upon reconversion to units of beamwidths, are replotted in FIG. 5.

In FIG. 5, the zero tracking error axis represents the position of the desired target and the lowermost dotted line represents the position of the undesired target. The tracking error without the target discriminating detector is again represented by the $Rs=\infty$ curve. It will be noted that the $Rs=\infty$ curve is discontinuous for target spacings of approximately 0.8 beamwidth as that is the point where beam resolution just begins to be effective. Targets separated more widely than 0.8 beamwidth are resolved by the beam and hence the error is reduced.

The curves of FIG. 5 demonstrate that for the non-linear case, the low $Rs$ values provide better tracking for closely spaced targets than is provided for widely spaced targets. The higher values of $Rs$ provide the opposite effect, namely improvement in accuracy as target spacing is increased.

If the radar is being used to guide a beam riding missile, and the error is toward the center of the formation, greater errors can be tolerated at close target spacing for the reason that the probability of killing both targets with a single missile is increased. Therefore, the higher values of $Rs$ are recommended as being most suitable for general applications.

In the preceding description of the invention it will be noted that the target discriminator has been considered with respect to a single reference plane, namely the elevation plane. The discussion is equally applicable to targets lying solely in the azimuth plane provided the target discriminator is transferred to the azimuth error channel. If target discriminators are employed simultaneously in the azimuth and elevation channels, targets disposed in diagonal formations are capable of confusing the radar. For example, if the targets are flying with one to the lower left and the other diagonally to the upper right, the elevation discriminator might depress the radar axis while the azimuth discriminator moves the axis to the right. In this example the tracking error is increased rather than decreased. Of course if the targets were disposed along an opposite diagonal, the tracking is improved. It is therefore a matter of choice as to whether target discriminators are employed in one or both of the error channels.

Obviously many modifications and variations of the present invention are possible in the light of the above teachings. It is therefore to be understood that within the scope of the appended claims the invention may be practiced otherwise than as specifically described.

What is claimed is:

1. In a radar of the simultaneous lobe comparison type having means providing a signal indicating a tracking error, a target discriminator for reducing the error in tracking multiple targets in formation, comprising, means for separating the relatively high frequency components from the relatively low frequency components of the signal indicating an error in tracking, means for rectifying said high frequency components, and means for adding said rectified high frequency components to said error signal, the sum of said rectified signal and said error signal producing a signal for altering the pointing of said radar.

2. In an automatic tracking radar of the simultaneous lobe comparison type, a target discriminator for biasing the pointing of the radar in the direction of a single target contained in a multiple target formation, said discriminator comprising, means receiving a signal indicating an error in the pointing direction of said radar and extracting therefrom the relatively high frequency components, means for rectifying said extracted components, means for filtering said rectified components to remove the high frequency products of rectification, and means for adding to said pointing error signal a portion of said filtered rectified components to provide a modified pointing error signal, said modified pointing error signal constituting the input signal to a servomechanism controlling the pointing of said radar.

3. In combination with an automatic tracking radar of the simultaneous lobe comparison type having an error detector and a servomechanism for positioning the antenna of said radar, a target discriminator for biasing the radar pointing direction towards a single target contained in a multiple target formation, comprising, a filter receiving the output of said error detector and transmitting said output to said servomechanism, said filter having a low pass characteristic for transmitting low frequency error signals without attenuation, a rectifier receiving the output of said error detector and connected in parallel with a portion of said filter whereby a portion of the high frequency signals normally attenuated by said filter are by-passed through said rectifier to the input of said servomechanism thereby providing an increased direct voltage input to said servomechanism in the presence of high frequency error signals.

4. In an automatic tracking radar of the simultaneous lobe comparison type having an error detector and a servomechanism for positioning the antenna of said radar in accordance with the output of said detector, a target discriminator for biasing the radar pointing direction toward a single target contained in a multiple target formation, comprising, a first resistor connected in series between the output of said error detector and the input to said servomechanism, a capacitor connected from the input of said servomechanism to ground, said capacitor having a low impedance to relatively high frequency signals thereby attenuating the same, and a non-linear impedance connected in parallel with said first resistor, said impedance supplying unidirectional current to the input of said servomechanism.

5. A target discriminator as claimed in claim 4, wherein said non-linear impedance comprises a diode and a second resistor having one of its terminals connected to one of the electrodes of said diode, the remaining electrode of said diode being connected to one of the terminals of said first resistor and the remaining terminals of said second resistor being connected to the remaining terminal of said first resistor.

6. A target discriminator as claimed in claim 5, wherein said first and second resistors have substantially equal resistance values.

References Cited in the file of this patent
UNITED STATES PATENTS 2,759,154   Smith et al. _____ Aug. 14, 1956